UNITED STATES PATENT OFFICE.

LOUIS ENRICHT, OF CHICAGO, ILLINOIS, ASSIGNOR TO THE UNITED STATES DUROLITHIC COMPANY, OF WEST UNION, IOWA.

MANUFACTURE OF ARTIFICIAL STONE.

SPECIFICATION forming part of Letters Patent No. 486,446, dated November 22, 1892.

Application filed December 15, 1891. Serial No. 415,182. (No specimens.)

*To all whom it may concern:*

Be it known that I, LOUIS ENRICHT, a citizen of the United States, residing at Chicago, in the county of Cook and State of Illinois, have invented a certain new and useful Improvement in the Manufacture of Artificial Stone, (Case No. 2,) of which the following is a full, clear, concise, and exact description.

My invention relates to the process and composition of matter used in the production of cement or artificial stone; and its object is to produce a stone or cement which has magnesium as a base, but which possesses the quality heretofore wanting in magnesium artificial stones of being proof against the attack of atmospheric and climatic influences. The agent against whose destructive influence it is most necessary to guard is the carbonic-acid gas present in the atmosphere. This carbonic-acid gas attacks vigorously and rapidly destroys artificial magnesium stone when the stone is in a moist or wet condition. To resist the action of the carbonic-acid gas, it is necessary to render the stone impervious to water, and thus prevent the access of moisture, through the medium of which the carbonic-acid gas would attack the stone and cause it to disintegrate.

To accomplish this purpose is the object of my invention, and in practicing the invention I proceed as follows: As the collection and retention of moisture in oxysulphate of magnesia stone is largely the result of the presence of sulphate of calcium—a stone of weak consistency unfitted to withstand atmospheric influences or moisture—I found it necessary to have recourse to some process or combination to remove or neutralize the deleterious influence of this stone. Now calcium sulphate is derived from the calcium oxide which is present in commercial magnesium oxide. This calcium oxide with the sulphuric acid in magnesium sulphate forms calcium sulphate or gypsum when the magnesium sulphate and magnesium oxide are mixed as has hitherto been done in the manufacture of magnesium artificial stone; but by mixing acid albumen with the oxysulphate of magnesia mass the formation of calcium sulphate is prevented and I have instead an albuminate of lime—a hard and insoluble material of great strength. The acid albumen also enters into chemical combination with the magnesium, forming albuminate of magnesium—a strong, compact, and insoluble substance. I procure the acid albumen by taking four ounces of egg-albumen and dissolving it in twenty ounces of water. As this egg-albumen would at once coagulate if I should mix it with magnesium sulphate, it is necessary to render it non-coagulable. This is accomplished by acidifying the egg-albumen with dilute hydrochloric acid by the process of osmose, as if the acid were brought in direct contact with the egg-albumen the egg-albumen would be coagulated without being acidified. This acid egg-albumen I add to fifty pounds of magnesium oxide and three gallons magnesium-sulphate solution of at least 20° Baumé. After thoroughly mixing I add sand or some other inert substance in the proportion of from one to twenty times as much inert material as acid-albumen oxysulphate of magnesium mixture. The material is then ready to be molded in any manner desired, being in a plastic state. It may be brought to any degree of plasticity or even to a state of fluidity by the addition of water to the mass. The mass will crystallize and harden into a compact stone of great strength and absolutely impervious to moisture. The time which it would take to harden depends upon the temperature. The warmer the temperature the quicker the mass will become hard. It generally takes from four to twenty-four hours for the cement to properly set.

The proportions of the various ingredients mentioned above may be varied considerably without serious detrimental results. The inert material added to the binding-cement is varied to meet the requirements for which the product is intended to be used. By varying the inert material I can thus imitate any stone desired.

The best results with this process are obtained by the use of sand, quartz, or other non-absorbent inert substances. When using sawdust, wood-pulp, or other material which is more porous, a greater quantity of magnesium-sulphate solution or a greater quantity of water is desirable, as the porous material absorbs a considerable portion of the magnesium-sulphate solution, which thereby is prevented from entering into chemical combination with the magnesium oxide or acid albumen.

Having thus described my invention, what I claim as new, and desire to secure by Letters Patent, is—

1. The process of making cement, which consists of mixing non-coagulable albumen with oxysulphate of magnesium in a plastic state and while the mixture is still plastic adding thereto inert material, whereby the cement is rendered impervious to moisture, substantially as described.

2. The herein-described composition of matter for the production of artificial stone, consisting of non-coagulable albumen, magnesium oxide, magnesium sulphate, and an inert substance, in substantially the proportions specified.

In witness whereof I hereunto subscribe my name this 12th day of December, A. D. 1891.

LOUIS ENRICHT.

Witnesses:
CHARLES A. BROWN,
GEORGE L. CRAGG.